United States Patent
Von Schoultz

(10) Patent No.: US 11,377,790 B2
(45) Date of Patent: Jul. 5, 2022

(54) METHOD FOR EXTRACTING BIOMASS

(71) Applicant: CH-Bioforce Oy, Espoo (FI)

(72) Inventor: Sebastian Von Schoultz, Parainen (FI)

(73) Assignee: CH-Bioforce Oy, Espoo (FI)

( * ) Notice: Subject to any disclaimer, the term of this patent is extended or adjusted under 35 U.S.C. 154(b) by 36 days.

(21) Appl. No.: 16/796,898

(22) Filed: Feb. 20, 2020

(65) Prior Publication Data

US 2020/0256013 A1   Aug. 13, 2020

Related U.S. Application Data

(63) Continuation of application No. 14/413,409, filed on Jan. 7, 2015, now abandoned.

(30) Foreign Application Priority Data

Jul. 11, 2012 (FI) .................................... 20120229

(51) Int. Cl.
| | |
|---|---|
| D21C 3/00 | (2006.01) |
| C08H 8/00 | (2010.01) |
| C08H 7/00 | (2011.01) |
| D21C 1/02 | (2006.01) |
| D21C 1/10 | (2006.01) |
| C13K 13/00 | (2006.01) |
| C10L 5/44 | (2006.01) |
| C10L 5/36 | (2006.01) |
| C07G 1/00 | (2011.01) |

(52) U.S. Cl.
CPC .............. *D21C 3/006* (2013.01); *C07G 1/00* (2013.01); *C08H 6/00* (2013.01); *C08H 8/00* (2013.01); *C10L 5/363* (2013.01); *C10L 5/442* (2013.01); *C13K 13/002* (2013.01); *D21C 1/02* (2013.01); *D21C 1/10* (2013.01); *C10L 2200/0469* (2013.01); *Y02E 50/10* (2013.01); *Y02E 50/30* (2013.01)

(58) Field of Classification Search
CPC .......... G08B 29/126; C07G 1/00; C08H 6/00; C08H 8/00; D21C 1/02; D21C 1/10; D21C 3/006; Y02E 50/10; Y02E 50/30; C10L 2200/0469; C10L 5/363; C10L 5/442; C13K 13/002
See application file for complete search history.

(56) References Cited

U.S. PATENT DOCUMENTS

| | | | |
|---|---|---|---|
| 1,339,489 A * | 5/1920 | Weiss ................ | D21C 11/0007 435/165 |
| 1,358,129 A | 11/1920 | Weiss | |
| 2,186,893 A | 1/1940 | Bayerl | |
| 2,999,784 A | 12/1961 | Hullmann | |
| 5,207,870 A * | 5/1993 | Aho ........................ | D21C 1/10 162/246 |
| 5,698,667 A | 12/1997 | Speaks et al. | |
| 5,756,098 A | 5/1998 | Price et al. | |
| 8,136,747 B2 | 3/2012 | Wingerson | |
| 2006/0096163 A1 | 5/2006 | Dickinson et al. | |
| 2008/0029233 A1 | 2/2008 | Wingerson et al. | |
| 2008/0142176 A1 | 6/2008 | Van Heiningen et al. | |
| 2010/0330633 A1 | 12/2010 | Walther et al. | |
| 2011/0026300 A1 | 2/2011 | Ogata | |
| 2011/0124057 A1 | 5/2011 | Genta et al. | |
| 2011/0192073 A1 | 8/2011 | Kale | |
| 2011/0263004 A1 * | 10/2011 | Ilvesniemi ............... | D21C 5/00 435/274 |
| 2011/0263886 A1 | 10/2011 | Kale | |
| 2012/0041186 A1 | 2/2012 | Pschorn et al. | |
| 2012/0168102 A1 | 7/2012 | Yoon et al. | |
| 2012/0282660 A1 | 11/2012 | Van Groenestijn et al. | |

FOREIGN PATENT DOCUMENTS

| | | |
|---|---|---|
| CA | 1010859 | 5/1977 |
| CA | 2368872 | 10/2000 |
| CN | 101643796 | 2/2010 |
| CN | 102084055 | 6/2011 |
| CN | 102239186 | 11/2011 |
| CN | 102276760 | 12/2011 |
| DE | 3225074 | 1/1984 |
| WO | 00/34568 | 6/2000 |
| WO | 00/61276 | 10/2000 |
| WO | 2005/075609 | 8/2005 |
| WO | 2007/090926 | 8/2007 |
| WO | 2009/034235 | 3/2009 |
| WO | 2011/061400 | 5/2011 |

OTHER PUBLICATIONS

Fardim et al., "Extractives on Fiber Surfaces Investigated by XPS, ToF-SIMS and AFM," 255 Colloids & Surfaces A: Physicochem. and Eng. Aspects 91 (2005).
Green et al., "Mechanical Properties of Wood", Chapter 4, pp. 1-46 of Wood Handbook—Wood as an Engineering Material (1999) (Gen. Tech. Rep. FPL-GTR-113, US Department of Agriculture, Forest Service, Madison, Wisconsin).
Iiyama et al., "An Improved Acetyl Bromide Procedure for Determining Lignin in Woods and Wood Pulps," 22 Wood Sci. Technol. 271 (1988).
Leppanen et al., "Pressurized Hot Water Extraction of Norway Spruce Hemicelluloses Using a Flow-Through System," 45 Wood Sci. Technol. 223 (2011).
Orsa et al., "Dissolution and Dispersion of Spruce Wood Components into Hot Water," 31 Wood Sci. Technol. 279 (1997).
Pettersen, "The Chemical Composition of Wood," Chapter 2 of the Chemistry of Solid Wood (Rowell ed. 1984) (Advances in Chemistry Series 207, American Chemical Society, Washington, DC).

(Continued)

*Primary Examiner* — Ellen M McAvoy
*Assistant Examiner* — Chantel L Graham
(74) *Attorney, Agent, or Firm* — Laine IP Oy

(57) ABSTRACT

Method for extraction of biomass with water in order to separate hemicelluloses from a fibrous structure. The biomass is impregnated under reduced pressure with the extraction fluid in order to prevent the degradation of the components to be extracted. During extraction the extract is circulated through the fiber matrix in order to remove unwanted components from the extract. The extract is reused for extracting untreated biomass in order to increase the consistency of the extract.

11 Claims, 2 Drawing Sheets

(56) References Cited

OTHER PUBLICATIONS

Sunberg et al., "Determination of Hemicelluloses and Pectins in Wood and Pulp Fibres by Acid Methanolysis and Gas Chromatography," 4 Nordic Pulp and Paper Research J. 216 (1996).

* cited by examiner

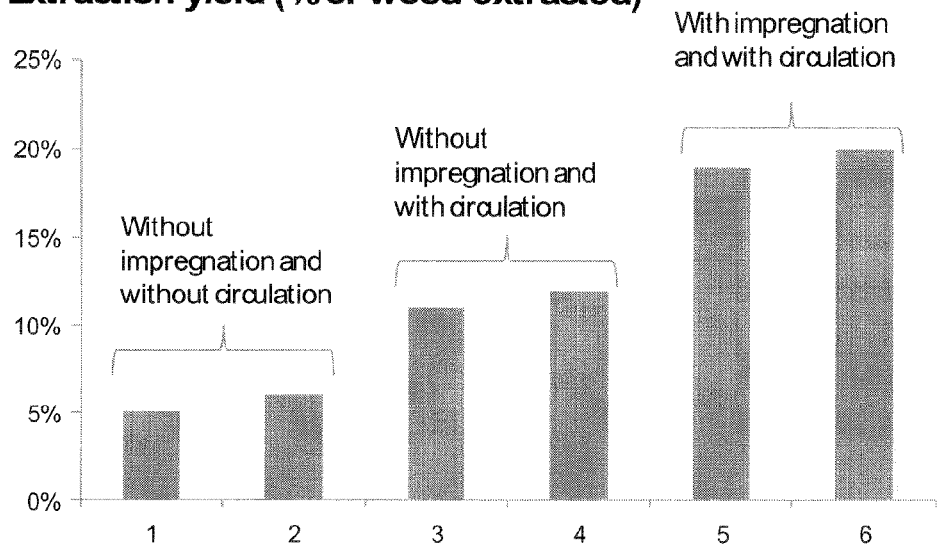
Figure 1. The effect of vacuum impregnation of biomass and circulation of the extraction water.
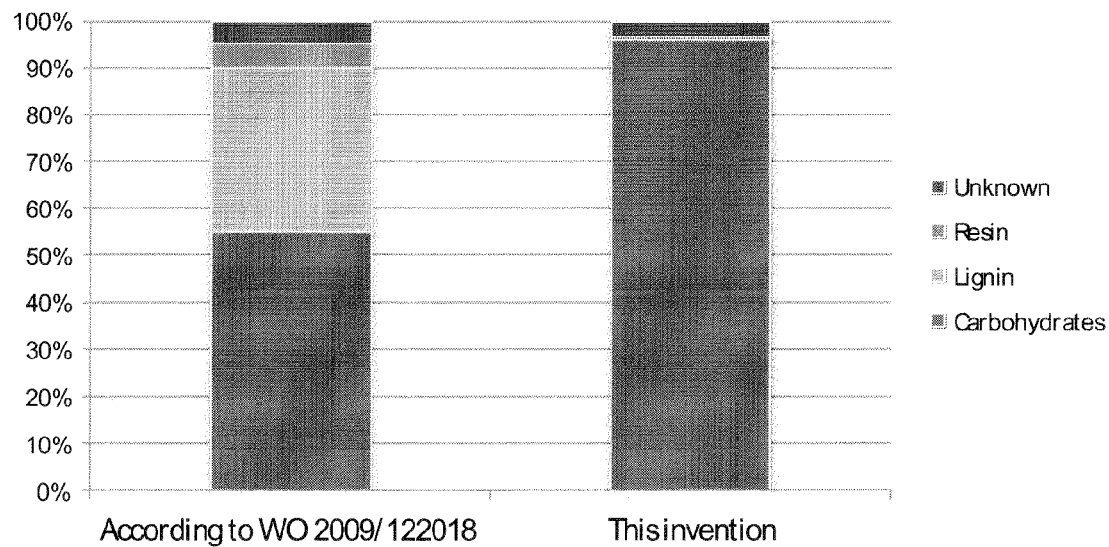
Figure 2. Extract composition according to method described in WO2009122018 and in this invention.

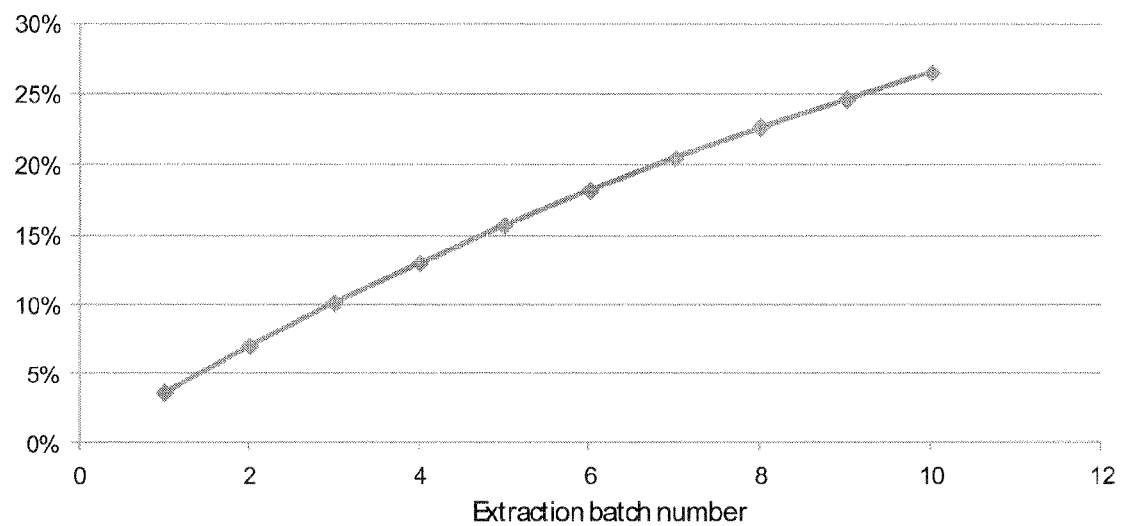
Figure 3. Solids content increase as a result of the reuse of extraction water in multiple extractions.

METHOD FOR EXTRACTING BIOMASS

FIELD OF THE INVENTION

The present invention relates to a method for extracting sugars and derivates thereof and the corresponding polysaccharides especially hemicelluloses from lignocellulosic biomass with hot water. In particular the present innovation concerns a method to produce high concentration of high purity hemicellulose extract with minimal use of water. The extract is circulated through the biomass several times and as a result the concentration of the hemicelluloses in the water phase is increased. The circulating loop is vital in order for the non-hemicellulose material, such as lignin, to be adsorbed back to the biomass. The circulation also enables gentle extraction conditions regarding temperature, pressure and pH as the method does not require maximum extraction during the first extraction loop. Minimal oxidation and degradation of the hemicelluloses is achieved by removing virtually all of the air and especially oxygen gas from inside of the pores of the biomass during a impregnation step assisted by reduced pressure. The concentration of the extract is increased by using the same extract in several extractions of new and previously un-extracted biomass.

DESCRIPTION OF RELATED ART

Wood based biomass contains about 25% of hemicelluloses. Extraction of biomass is a very well known process and has traditionally been extracted with alkali. During this kind of treatment hemicelluloses are degraded and the fibrous material is decomposed.

Traditional extraction with only hot water degrades the sugars into toxic compounds such as furfural.

Steam explosion is another well know method for extracting carbohydrates from biomass. However, even this method involves the formation of toxic compounds.

A recent method for extracting hemicelluloses from biomass involves continuous flow of hot water extraction. The problem with this method is, that it produces a very diluted extract containing up to 30% lignin impurities (WO 2009/122018 and Leppanen et al.: Pressurized hot water extraction of Norway spruce hemicelluloses using a flow-through system, Wood Sci Technol (2011) 45:223-236)

All the known extraction methods of hemicelluloses results in extremely low solids content of the extract, and require expensive concentration of the extract. This results in an economically unsound product for transport and further treatment. (WO0034568, US2008029233, U.S. Pat. No. 8,136,747, DE3225074).

A recent patent publication WO2007090926 describes a method for recovering hemicelluloses with higher concentration through steam hydrolysis. The drawback with this approach is that hydrolysis always involves deacetylation of the hemicelluloses which effectively lowers their water solubility and also degrades the polymers by lowering the molar mass. Chemical and food industry are interested in polysaccharides with high molar mass which the aforementioned method is unable to provide.

Publication WO0061276 discloses a method for hydrolysis of hemicelluloses primarily into monomeric sugars which is a drawback especially if polymers are desired.

The main problem with known methods is the fact that they do not efficiently prevent oxidation, hydrolysis, degradation and deacetylation of the biomass. Especially the presence of air and oxygen gas inside of the pores of the biomass has prevented an efficient and gentle extraction procedure. Traditionally biomass impregnation and air removal from inside of biomass capillaries has been for example achieved through presteaming of biomass with high temperature steam and high pressure. However, this procedure causes oxidation and hydrolysis of hemicelluloses and is therefore unsuited for extracting hemicelluloses without degradation.

SUMMARY OF THE INVENTION

It is an aim of this invention it to overcome the problems related to known art and to provide an improved method for extracting biomass with water.

In particular, it is an aim of the invention to provide a method which effectively minimizes oxidation and degradation of the biomass extract.

It is further an aim to provide a method to concentrate and purify the extract with minimal water consumption, without the need for expensive evaporation and purification steps.

More specifically, the method according to the invention is characterized by what is stated in claim 1.

BRIEF DESCRIPTION OF THE DRAWINGS

The foregoing aspects and many of the attendant advantages of this invention will become even more apparent by reference to the accompanying drawings, wherein:

FIG. 1 is a graph showing the effect of vacuum impregnation of biomass and circulation of extraction water on extraction percentage;

FIG. 2 is a graph comparing a prior art method to the claimed method in terms of percent of extracted dry solids; and FIG. 3 is a graph of solids content of the extract as a result of the reuse of extraction water in multiple extractions.

DETAILED DESCRIPTION OF THE INVENTION

The present invention is based on the finding that air and more specifically oxygen gas causes severe oxidation and degradation of sugars and polysaccharides at high temperatures. Reducing the air pressure inside of a reactor containing biomass, following the filling of the reactor with water effectively fills the capillaries of the biomass resulting in an almost completely oxygen free environment inside of the biomass.

The present invention is further based on the finding that recirculation of the extract through the biomass purifies the extract from unwanted compounds such as lignin and other polyphenols. The presence of phenolic substances such as lignin in the extract lowers the capacity of microbes to digest polysaccharides and therefore the production of biofuels becomes less economical.

The method according to the invention allows a long time for the extract to be kept at high temperatures without significant oxidation and degradation of the molecules and polymers in the extract. This further allows the extract to be reused for extraction of un-extracted biomass which enables the consistency of the extract to be increased significantly without evaporation of the solvent.

By removing hemicelluloses from the fiber fraction the energy value and the lignin content of the biomass increases. At the same time the fiber fraction properties become more suitable for the making of pellets and chipboards.

Therefore, present invention comprises of the steps:
Feed the biomass into an reactor
Remove most of the air and oxygen gas from the biomass by reducing the pressure inside of the reactor
Impregnate the biomass with the extraction water. During the first extraction this is plain water and in later extractions this is the extract from the previous extraction
Start circulating the extraction water through the biomass
Increase the temperature to extraction temperature
Circulate the extraction fluid until desired consistency and purity is reached
Remove the extraction water from the reactor
Remove the biomass from the reactor
Start over from the first step

EXAMPLES

The effect of extract circulation and impregnation under reduced pressure (0.8 Bar under pressure) was investigated. The biomass was 200 grams (O.D.) of Scott spine chips (*Pinus Sylvestris*). The water to wood ration was 5:1. The extraction water was kept at 150° C. for two hours. In experiments with circulation, the extract had circulated 10 times through the biomass. The pH of the extract was measured every half hour. In experiments where the biomass was impregnated, hence most of the air and oxygen gas was removed from the reactor, no changes in pH could be noted. In experiments without impregnation under reduced pressure a significant pH drop, typically over one pH unit was recorded. This indicated that the formation of acids, especially through deacetylation of the biomass did not occur in the experiments with impregnation. The yield of the extractions is shown in FIG. 1. The extracts were analyzed by gas chromatography for carbohydrates (Sundberg A, Sundberg K, Lillandt C, Holmbom B (1996) Determination of hemicelluloses and pectins in wood and pulp fibers by acid methanolysis and gas chromatography. Nord Pulp Pap Res J11(4):216-219) and lipophilic extractives (F. Örsa, B. Holmbom and J. Thornton, Wood Sci. Technol. 31 (1997) 279). Lignin was determined according to the method by Iiyama et al. (Iiyam, K.; Wallis, A. F A. An improved acetyl bromide procedure for determining lignin in wood and wood pulps. Wood Sci. Technol. 1988, 22, 271-280). The samples without impregnation and circulation contained 55% hemicelluloses, 35% lignin and 5% lipophilic extractives and 5% unidentified. Samples without impregnation and with circulation contained 90% hemicelluloses, 1.5% lipophilic extractives and 8.5% unidentified. Samples with impregnation and circulation contained 96% carbohydrates and 0.5% lipophilic compounds. The remaining 3.5% was unidentified. The results clearly show that the circulation removes most of the initially released lignin and extractives. The impregnation and air and oxygen removal procedures clearly increases the extraction yield and reduces the amount of unidentified components which are most likely oxidized lignin fragments. By comparing the extract composition when using both impregnation and circulation with an extract produced according to the method described in WO2009122018, we can clearly see the benefits of using the method described in this document (FIG. 2). This method produces an extract without unwanted impurities, especially lignin.

FIG. 1 shows the extraction yield of six different extractions:
two without impregnation under reduced pressure and without circulation of extract
two without impregnation under reduced pressure but with circulation of the extract
two with impregnation under reduced pressure and circulation of the extract.

Oxidation of the extracted components was prevented by keeping the extract in oxygen gas reduced environment. Extracting under minimized presence of oxygen gas produces a clear yellow and transparent extract. However, if the extract comes in contact with oxygen gas, it turns dark brown within minutes and the oxidization will continue even at room temperature. Extracts which were removed from the reactor into nitrogen saturated environment did not show signs of oxidization nor did the color of the extract change.

By reusing the extract from previous extraction the consistency of the extract could be increased significantly by each batch without any significant changes in the pH of the extract or the molar mass and composition of the carbohydrates. FIG. 3 shows the consistency increase of the extract by reusing the extract.

The invention claimed is:

1. A method of treating biomass containing a fibrous structure and polysaccharides, comprising:
    impregnating the biomass with water by removing air and oxygen gas to produce a reduced pressure of at least 0.3 bar prior to an extractive treatment;
    subjecting the biomass to extractive treatment in which it is heated in an aqueous phase at a pressure below 8 bar and at a temperature about 150° C. to under 160° C.;
    separating a polysaccharide-rich extract from the biomass into a reduced oxygen gas environment as a first fraction in said aqueous phase;
    recovering the fibrous structure of the biomass as a second fraction;
    recirculating the aqueous phase through the biomass in order to extract additional biomass,
    wherein the biomass is wood-based.

2. The method of claim 1, wherein said first fraction is separated in the form of oligomers and polymers.

3. The method of claim 2, where the first fraction is hydrolyzed or used as food for microbes in the production of fuel or as raw material for chemical products.

4. The method of claim 1, wherein the second fraction is further treated to separate lignin from the fibrous structure.

5. The method of claim 1, wherein the second fraction is used for production of paper or cardboard.

6. The method of claim 1, wherein the second fraction is used for production of pellets or as raw material for fuel.

7. The method of claim 1, wherein the second fraction is used for production of particle board.

8. Method according to claim 1, wherein said wood-based biomass comprises chips or sawdust.

9. The method of claim 1, further comprising
    subjecting at least one of said first and second fractions to a further treatment.

10. The method of claim 1, wherein said reduced oxygen gas environment comprises a nitrogen saturated environment.

11. The method of claim 1, wherein said aqueous phase is recirculated through said biomass until impurities comprising lignin and oxidized lignin fragments are reduced to a maximum percentage of 3.5% of dry solids of the polysaccharide-rich extract.

* * * * *